US012418105B2

(12) United States Patent
Spencer et al.

(10) Patent No.: US 12,418,105 B2
(45) **Date of Patent: *Sep. 16, 2025**

(54) TECHNIQUES FOR CONDUCTIVE PARTICLE BASED MATERIAL USED FOR AT LEAST ONE OF PROPAGATION, EMISSION AND ABSORPTION OF ELECTROMAGNETIC RADIATION

(71) Applicant: nCap Licensing, LLC, Heber City, UT (US)

(72) Inventors: Rhett Francis Spencer, Heber City, UT (US); Eric Guzman Hernandez, Tampa, FL (US); Anthony Joseph Sutera, Heber City, UT (US)

(73) Assignee: nCap Licensing, LLC, Heber, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/318,665

(22) Filed: May 16, 2023

(65) Prior Publication Data

US 2023/0291096 A1 Sep. 14, 2023

Related U.S. Application Data

(63) Continuation of application No. 17/379,993, filed on Jul. 19, 2021, now Pat. No. 11,652,289, which is a continuation of application No. 16/701,126, filed on Dec. 2, 2019, now Pat. No. 11,069,971, which is a continuation of application No. 15/960,544, filed on Apr. 23, 2018, now Pat. No. 10,498,024, which is a (Continued)

(51) Int. Cl.

| | |
|---|---|
| ***H01Q 1/52*** | (2006.01) |
| ***H01Q 1/24*** | (2006.01) |
| ***H01Q 1/36*** | (2006.01) |
| ***H01Q 1/38*** | (2006.01) |
| ***H01Q 17/00*** | (2006.01) |

(52) U.S. Cl.

CPC ............... *H01Q 1/526* (2013.01); *H01Q 1/24* (2013.01); *H01Q 1/364* (2013.01); *H01Q 1/38* (2013.01); *H01Q 17/004* (2013.01); *Y10T 29/49016* (2015.01)

(58) Field of Classification Search

CPC ......... H01Q 1/24; H01Q 1/526; H01Q 17/004

See application file for complete search history.

(56) References Cited

U.S. PATENT DOCUMENTS 10,318,859 B2 * 6/2019 Lowe ................... H01Q 1/2216
10,476,142 B2 * 11/2019 Newman .............. H01Q 1/3291

(Continued)

FOREIGN PATENT DOCUMENTS

JP 2007149757 A * 6/2007 ............. H01F 17/04

*Primary Examiner* — Hoang V Nguyen

(74) *Attorney, Agent, or Firm* — Jefferson IP Law, LLP; Raymond B. Persino

(57) ABSTRACT

An antenna system and method for fabricating an antenna are provided. The antenna system includes a substrate and an antenna. The antenna includes a conductive particle based material applied onto the substrate. The conductive particle based material includes conductive particles and a binder. When the conductive particle based material is applied to the substrate, the conductive particles are dispersed in the binder so that at least a majority of the conductive particles are adjacent to, but do not touch, one another.

28 Claims, 10 Drawing Sheets

Related U.S. Application Data continuation of application No. 14/804,018, filed on Jul. 20, 2015, now Pat. No. 9,954,276, which is a continuation of application No. 13/303,135, filed on Nov. 22, 2011, now Pat. No. 9,088,071.

(60) Provisional application No. 61/514,435, filed on Aug. 2, 2011, provisional application No. 61/477,587, filed on Apr. 20, 2011, provisional application No. 61/473,726, filed on Apr. 8, 2011, provisional application No. 61/416,093, filed on Nov. 22, 2010.

(56) References Cited

U.S. PATENT DOCUMENTS

| | | | | |
|---|---|---|---|---|
| 2012/0162047 | A1* | 6/2012 | Mizuno | H01Q 1/243<br>343/905 |
| 2017/0301630 | A1* | 10/2017 | Nguyen | H01Q 1/2291 |
| 2017/0324160 | A1* | 11/2017 | Khoury | H01Q 1/526 |

* cited by examiner

TECHNIQUES FOR CONDUCTIVE PARTICLE BASED MATERIAL USED FOR AT LEAST ONE OF PROPAGATION, EMISSION AND ABSORPTION OF ELECTROMAGNETIC RADIATION

CROSS-REFERENCE TO RELATED APPLICATIONS

This application is a continuation application of a prior application Ser. No. 17/379,993, filed on Jul. 19, 2021, which issued as U.S. Pat. No. 11,652,289 on May 16, 2023; which is a continuation application of a prior application Ser. No. 16/701,126, filed on Dec. 2, 2019, which issued as U.S. Pat. No. 11,069,971 on Jul. 20, 2021; which is a continuation application of a prior application Ser. No. 15/960,544, filed on Apr. 23, 2018, which issued as U.S. Pat. No. 10,498,024 on Dec. 3, 2019; which is a continuation application of a prior application Ser. No. 14/804,018, filed on Jul. 20, 2015, which issued as U.S. Pat. No. 9,954,276 on Apr. 24, 2018; which is a continuation application of prior application Ser. No. 13/303,135, filed on Nov. 22, 2011, which issued as U.S. Pat. No. 9,088,071 on Jul. 21, 2015, and which claims the benefit under 35 U.S.C. § 119(e) of a U.S. provisional patent application filed on Nov. 22, 2010 in the U.S. Patent and Trademark Office and assigned Ser. No. 61/416,093, a U.S. provisional patent application filed on Apr. 8, 2011 in the U.S. Patent and Trademark Office and assigned Ser. No. 61/473,726, a U.S. provisional patent application filed on Apr. 20, 2011 in the U.S. Patent and Trademark Office and assigned Ser. No. 61/477,587, and a U.S. provisional patent application filed on Aug. 2, 2011 in the U.S. Patent and Trademark Office and assigned Ser. No. 61/514,435, the entire disclosure of each of which is hereby incorporated by reference.

BACKGROUND OF THE INVENTION

1. Field of the Invention

The present invention relates to techniques for a material used for at least one of propagation, emission and absorption of electromagnetic radiation. More particularly, the present invention relates to techniques for a conductive particle based material used for at least one of propagation, emission and absorption of electromagnetic radiation.

2. Description of the Related Art

A conventional antenna is a device with an arrangement of one or more conductive elements that are used to generate a radiating electromagnetic field in response to an applied alternating voltage and the associated alternating electric current, or can be placed in an electromagnetic field so that the field will induce an alternating current in the antenna and a voltage between its terminals. The conductive elements employed in the conventional antenna are typically fabricated from solid metallic conductors. However, the use of solid metallic conductors is limiting.

Therefore, a need exists for an improved material used for at least one of propagation, emission and absorption of electromagnetic radiation, and implementations of the improved material.

SUMMARY OF THE INVENTION

An aspect of the present invention is to address at least the above-mentioned problems and/or disadvantages and to provide at least the advantages described below. Accordingly, an aspect of the present invention is to provide techniques for a conductive particle based material used for at least one of propagation, emission and absorption of electromagnetic radiation.

In accordance with an aspect of the present invention, an antenna system is provided. The antenna system includes a substrate and an antenna. The antenna includes a conductive particle based material applied onto the substrate. The conductive particle based material includes conductive particles and a binder. When the conductive particle based material is applied to the substrate, the conductive particles are dispersed in the binder so that at least a majority of the conductive particles are adjacent to, but do not touch, one another.

In accordance with another aspect of the present invention, an antenna enhancer system is provided. The antenna enhancer system includes an antenna and an antenna enhancer. The antenna enhancer includes a conductive particle based material. The antenna enhancer is disposed adjacent to and offset from the antenna. The conductive particle based material comprises conductive particles and a binder. When the conductive particle based material is disposed adjacent to and offset from the antenna, the conductive particles are dispersed in the binder so that at least a majority of the conductive particles are adjacent to, but do not touch, one another.

In accordance with yet another aspect of the present invention, a method for fabricating a conformable antenna is provided. The method includes selecting a substrate on which to fabricate an antenna, selecting a template corresponding to an antenna design, the template comprising one or more cut out portions, applying a conductive particle based material, through the one or more cutout portions of the template, and onto the substrate to form the antenna, and fixing a coupler of a feed line to the antenna. The conductive particle based material comprises conductive particles and a binder. When the conductive particle based material is applied to the substrate, the conductive particles are dispersed in the binder so that at least a majority of the conductive particles are adjacent to, but do not touch, one another.

In accordance with still another aspect of the present invention, an antenna enhancer is proved. The antenna enhancer includes an antenna enhancer element formed of a conductive particle based material, the antenna enhancer element being disposed adjacent to, offset from, and without encircling, at least one of a radiating or receiving antenna element, wherein the antenna enhancer element is electrically isolated, and wherein the conductive particle based material comprises conductive particles dispersed in a binder so that at least a majority of the conductive particles are adjacent to, but do not touch, one another.

In accordance with yet another aspect of the present invention, an antenna enhancer is proved. The antenna system includes a conductive substrate, and a radiating antenna element formed of a conductive particle based material comprising conductive particles dispersed in a binder so that at least a majority of the conductive particles are adjacent to, but do not touch, one another, wherein the conductive substrate is disposed in a first layer and the radiating antenna element is disposed in a second layer that is substantially parallel to the first layer, and wherein the conductive particle based material is applied directly onto, and without encircling, the conductive substrate.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, like reference numerals will be understood to refer to like parts, components, and structures.

DETAILED DESCRIPTION OF EXEMPLARY EMBODIMENTS

Figure 1:
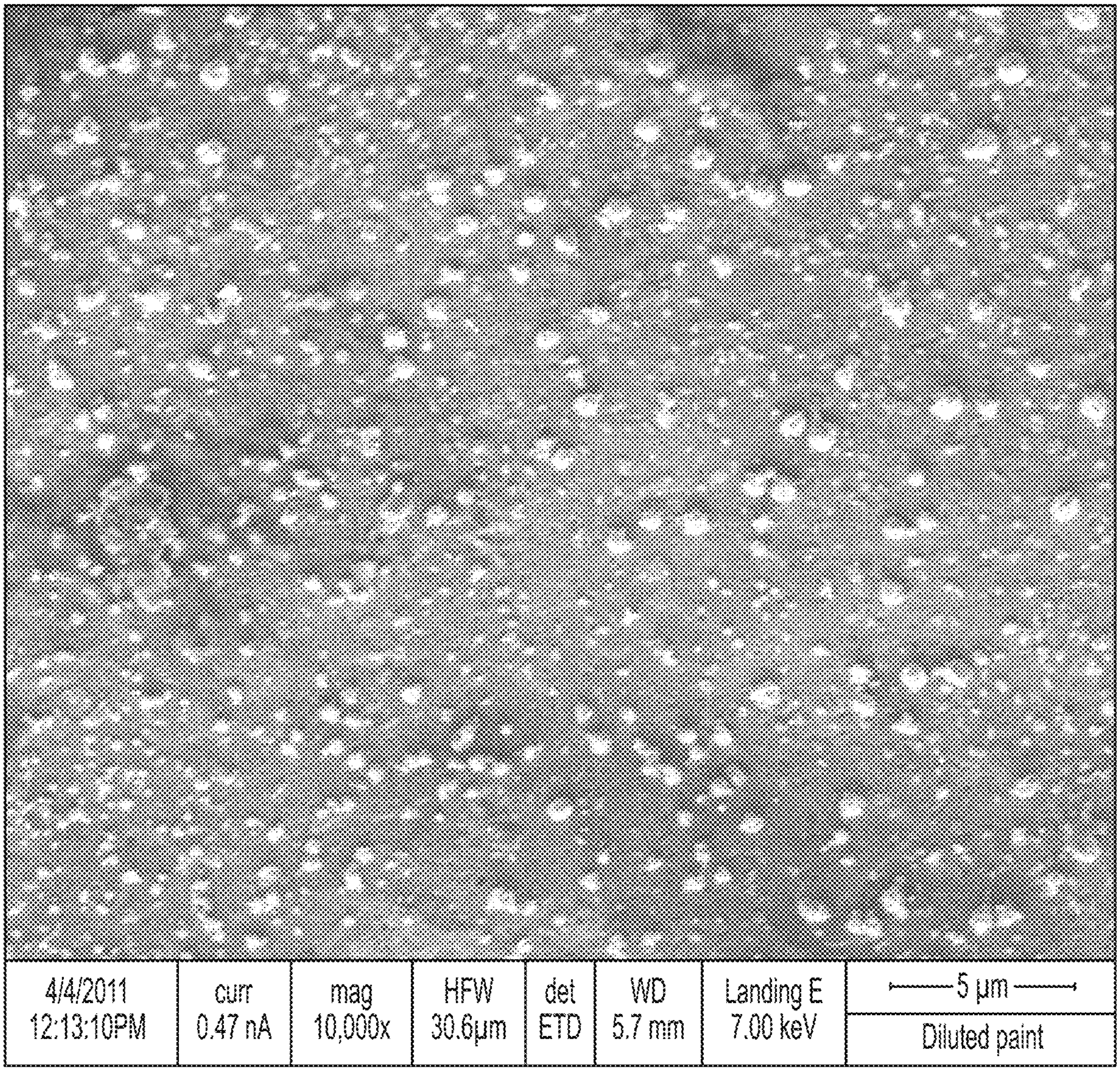
FIG. 1 is a captured image of a conductive particle based material according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

As used herein, the term "about" is used to provide flexibility to a numerical range endpoint by providing that a given value may be "a little above" or "a little below" the endpoint.

As used herein, the term "antenna" refers to a transducer used to transmit or receive electromagnetic radiation. That is, an antenna converts electromagnetic radiation into electrical signals and vice versa. Electromagnetic radiation is a form of energy that exhibits wave-like behavior as it travels through space. In free space, electromagnetic radiation travels close to the speed of light with very low transmission loss. Electromagnetic radiation is absorbed when propagating through a conducting material. However, when encountering an interface of such a material, the electromagnetic radiation is partially reflected and partially transmitted therethough. Herein, exemplary embodiments of the present invention described below are directed toward techniques that allow for a more efficient interface by reducing the reflections at the interface.

In addition, exemplary embodiments of the present invention described below relate to techniques for a conductive particle based material used for at least one of propagation, emission and absorption of electromagnetic radiation. While the techniques for the conductive particle based material may be described below in various specific implementations, the present invention is not limited to those specific implementations and is similarly applicable to other implementations.

An initial overview of the conductive particle based material is provided below and then specific implementations in which the conductive particle based material is employed are described in detail further below. This initial overview of the conductive particle based material is intended to aid readers in understanding the conductive particle based material that is the basis of various exemplary implementations, but is not intended to identify key features or essential features of those various exemplary implementations, nor is it intended to limit the scope of the claimed subject matter.

Conductive Particle Based Material

In one exemplary embodiment, a conductive particle based material is employed. The conductive particle based material includes at least two constituent components, namely conductive particles and a binder. However, the conductive particle based material may include additional components, such as at least one of graphite, carbon (e.g., carbon black), titanium dioxide, etc.

The conductive particles may be any conductive material, such as silver, copper, nickel, aluminum, steel, metal alloys, carbon nanotubes, any other conductive material, and any combination thereof. For example, in one exemplary embodiment, the conductive particles are silver coated copper. Alternatively, the conductive particles may be a combination of a conductive material and a non-conductive material. For example, the conductive particles may be ceramic magnetic microspheres coated with a conductive material such as any of the conductive materials described above. Furthermore, the composition of each of the conductive particles may vary from one another.

The conductive particles may be any shape from a random non-uniform shape to a geometric structure. The conductive particles may all have the same shape or the conductive particles may vary in shape from one another. For example, in one exemplary embodiment, each of the conductive particles may have a random non-uniform shape that varies from conductive particle to conductive particle.

The conductive particles may range in size from a few nanometers up to a few thousand nanometers. Alternatively, the conductive particles may range in size from about 400 nanometers to 30 micrometers. The conductive particles may be substantially similar in size or may be of various sizes included in the above identified ranges. For example, in one exemplary embodiment, the conductive particles are of various sizes in the range of about 400 nanometers to 30 micrometers. Herein, when a range of sizes of the conductive particles are employed, the distribution of the sizes may be uniform or non-uniform across the range. For example, 75% of the conductive particles may be a larger size within a given range while 25% of the conductive particles are a smaller size.

An effective amount of conductive particles are included relative to the binder so that the conductive particles are dispersed in the binder. The conductive particles may be randomly or orderly dispersed in the binder. The conductive particles may be dispersed at uniform or non-uniform densities. The conductive particles may be dispersed so that at least a majority of the conductive particles are closely adjacent to, but do not touch, one another.

The binder is used to substantially fix the conductive particles relative to each other and should be a non-conductive or semi-conductive substance. Any type of conventional or novel binder that meets these criteria may be used. The non-conductive or semi-conductive material of the binder may be chosen to function as a dielectric with a given permittivity.

The conductive particle based material may be formed as a rigid or semi-rigid structure. For example, the conductive particle based material may be a plastic sheet having the conductive particles dispersed therein. The conductive particle based material may be clear or opaque, and may include any shade of color.

In addition, the conductive particle based material may be a liquid, paint, gel, ink or paste that dries or cures. Here, the binder may include distillates, hardening agents, or solvents such as a Volatile Organic Compound (VOC). In this case, the conductive particle based material may be applied to a substrate. Also, when the conductive particle based material is a liquid, paint, gel, ink or paste that dries or cures, the binder may adhere to the substrate. The conductive particle based material may be spayed on, brushed on, rolled on, ink-jet printed, silk screened, etc. onto the substrate. The use of the conductive particle based material that is a liquid, paint, gel, ink or paste that dries or cures is advantageous in that the conductive particle based material may be thinly applied to a substrate and conform to the surface of the substrate. This allows the conductive particle based material to occupy very little space and, in effect, blend into the substrate.

The substrate may be the surface of at least one of a conductive, a non-conductive, or a semi-conductive substance. The substrate may be rigid, semi-flexible or flexible. The substrate may be flat, irregularly shaped or geometrically shaped. The substrate may be paper, cloth, plastic, polycarbonate, acrylic, nylon, polyester, rubber, metal such as aluminum, steel and metal alloys, glass, composite materials, fiber reinforced plastics such as fiberglass, polyethylene, polypropylene, textiles, wood, etc.

The substrate may have a coating applied thereto. The coating may be a conductive, non-conductive or semi-conductive substance. The coating may be a paint, gel, ink, paste, tape, etc. The coating may be chosen to function as a dielectric with a given permittivity.

At least one of a protective and concealing (or decorative) coating may be applied over the conductive particle based material once it has been applied to a substrate.

An example of the conductive particle based material is described below with reference to FIG. 1.

FIG. 1 is a captured image of a conductive particle based material according to an exemplary embodiment of the present invention.

Referring to FIG. 1, the conductive particle based material includes conductive particles and a binder. The conductive particles are randomly shaped, sized and located. However, conductive particles are dispersed so that at least a majority of the conductive particles are closely adjacent to, but do not touch, one another.

Herein, without intending to be limiting, for a conductive particle based material of a given density of conductive particles, the conductive particle based material may be applied at a thickness such that the conductive particles are dispersed in the binder so that at least a majority of the conductive particles are closely adjacent to, but do not touch, one another. Herein, without intending to be limiting, it has been observed that a conductive particle based material has a resistance of about 3-17 ohms across any given two points on the surface.

Herein, without intending to be limiting, it has been observed that when the conductive particle based material is formulated such that the conductive particles are dispersed in the binder so that at least a majority of the conductive particles are closely adjacent to, but do not touch, one another, the conductive particle based material exhibits properties that enable it to at least one of efficiently propagate electromagnetic radiation, efficiently absorb electromagnetic radiation from space, and efficiently emit electromagnetic radiation into space. Moreover, it has been observed that those properties may be either supplemented or enhanced by including an effective amount of carbon, such as carbon black, in the conductive particle based material. For example, an effective amount of carbon black may be an amount that corresponds to about 1-7% of the conductive particles included in the conductive particle based material.

Without intending to be limiting, it is believed that when electromagnetic radiation is introduced into the conductive particle based material, electromagnetic radiation may pass from conductive particle to conductive particle via at least one of capacitive and inductive coupling. Here, the binder may function as a dielectric. Thus, it is believed that the conductive particle based material may act as an array of capacitors, which may be at least part of the reason why the conductive particle based material at least one of efficiently propagates electromagnetic radiation, efficiently absorbs electromagnetic radiation from space, and efficiently emits electromagnetic radiation into space.

Alternatively or additionally, and without intending to be limiting, it is believed that the properties that enable the conductive particle based material to at least one of efficiently propagate electromagnetic radiation, efficiently absorb electromagnetic radiation from space, and efficiently emit electromagnetic radiation into space, may be explained by quantum theory at the atomic level.

Herein, without intending to be limiting, it has been observed that the conductive particle based material generates electrical energy when exposed to sunlight.

Herein, without intending to be limiting, it has been observed that the resistance of the conductive particle based material continuously changes over time. Herein, without intending to be limiting, it has been observed that, when energized with a radio signal, the conductive particle based material has infinitely low resistance to that signal.

Herein, while the present disclosure is described in the context of electromagnetic radiation, without intending to be limiting, it is believed that the present invention is equally applicable to bioelectromagnetic energy. Thus, any disclosure herein that refers to electromagnetic radiation equally applies to bioelectromagnetic energy.

Conductive Particle Based Antenna

In one exemplary embodiment, the conductive particle based material is employed to implement a conductive particle based antenna. When used as a conductive particle based antenna, the conductive particle based antenna is fabricated using the conductive particle based material. Here, the conductive particle based material may be formed into a shape that conforms to the desired characteristics of the antenna. For example, the shape and size of the antenna may vary depending on the frequency and/or polarization of the electromagnetic radiation to be communicated. The conductive particle based antenna is at least one of electrically, capacitively, and inductively coupled to at least one of a receiver, a transmitter, and a transceiver at a coupling point of the conductive particle based antenna. The coupling point of the conductive particle based antenna may substantially be an end point of the conductive particle based antenna. The coupling point of the conductive particle based antenna may be coupled to a coupling point of a feed line electrically connected to the receiver, transmitter, or transceiver. When capacitively or inductively coupled, the coupling may occur through a distance that includes an air gap or that has a substance, such as glass, disposed therein.

When a conductive particle based antenna is fabricated using the conductive particle based material, the conductive particle based antenna may exhibit a broad bandwidth self-tuning characteristic by using only a small section of the conductive particle based antenna to emit the electromagnetic radiation into space.

In addition, when the conductive particle based antenna is fabricated using the conductive particle based material, there may be no or little $I^2R$ losses due the small practical size and the majority of the particles not contacting each other. In addition, there may be no or little Radio Frequency (RF) skin effect losses due to the small practical size. Once the signal is coupled to the conductive particle based antenna, the conductive particle based antenna provides little to no resistance to the transmission signal and it is emitted without significant loss into space. The same may happen in reverse for receiving. That is, the received signal may be absorbed and delivered with little to no loss to the coupling device and is then propagated down a feed line to a receiver.

An example of the conductive particle based antenna is described below with reference to FIG. 2.

Figure 2:
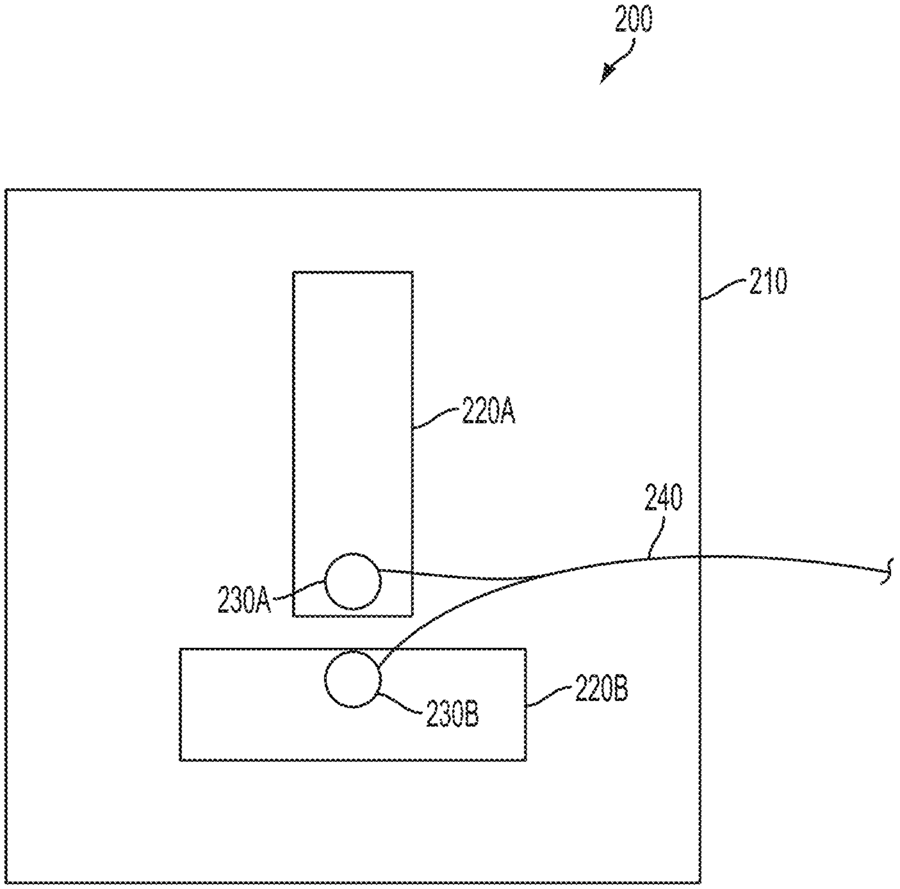
FIG. 2 illustrates a conductive particle based antenna according to an exemplary embodiment of the present invention.

FIG. 2 illustrates a conductive particle based antenna according to an exemplary embodiment of the present invention. The particular structure of the conductive particle based antenna 200 shown in FIG. 2 is merely an example used for explanation and is not intended to be limiting. The conductive particle based material used to fabricate the conductive particle based antenna 200 of FIG. 2 is assumed to be formulated as a liquid, paint, gel, ink, or paste that dries or cures.

Referring to FIG. 2, the conductive particle based antenna 200 includes a substrate 210, a first antenna segment 220A, a second antenna segment 220B, a first coupler 230A, a second coupler 230B, and a feed line 240.

The substrate 210 is a rigid flat sheet of a non-conductive material, such as plexiglass. However, any other surface may be chosen as substrate 210. For example, the surface of a vehicle, the wall of a building, the casing of a wireless device, glass, a tree, cloth, a rock, a plastic sheet, etc., may be chosen as the substrate. When a conductive material is chosen as the substrate 210, an insulative coating of a non-conductive or semi-conductive material may be applied to the area of the substrate 210 where the conductive particle based antenna 200 is to be applied. Examples of the insulative coating of the non-conductive or semi-conductive material include plastic tape, paper tape, paint, etc. Also, when the substrate 210 is a conductive material, the substrate may be utilized as a ground plane. In addition, a surface preparation coating may be applied to the substrate 210 that allows for better adhesion of the conductive particle based material to the substrate 210. The insulative coating may serve the same function as the surface preparation coating. Also, the surface preparation coating may be applied beneath or on top of the insulative coating. Furthermore, the surface preparation coating may be used when the insulative coating in not applied.

The first antenna segment 220A and the second antenna segment 220B are applied to the substrate 210 according to a desired design. Here, the first antenna segment 220A is functioning as an active antenna element and the second antenna segment 220B is functioning as a ground plane. When the substrate 210 is functioning as a ground plane or an earth ground is employed, the second antenna segment 220B may be omitted. Here, the first antenna segment 220A and the second antenna segment 220B are formed using a conductive particle based material formulated as a liquid, paint, gel, ink, or paste that dries or cures. The non-conductive material may be sprayed on, brushed on, rolled on, silk screened, ink jet printed, etc.

The first coupler 230A and the second coupler 230B at least one of electrically, capacitively, and inductively couple to the first antenna segment 220A and the second antenna segment 220B, respectively. In addition, the first coupler 230A and the second coupler 230B adhere to, or are otherwise in a fixed relationship with, the first antenna segment 220A and the second antenna segment 220B. The first coupler 230A and the second coupler 230B are electrically connected to respective portions of the feed line 240.

The feed line 240 is electrically connected to first coupler 230A and the second coupler 230B. Also, the feed line 240 is electrically connected to at least one of a receiver, a transmitter, and a transceiver.

An example of a structure of a conductive particle based antenna is described below with reference to FIG. 3.

Figure 3:
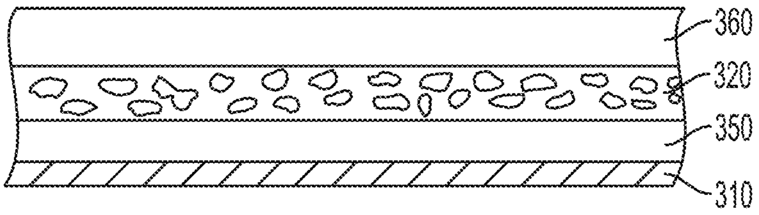
FIG. 3 illustrates a structure of a conductive particle based antenna according to an exemplary embodiment of the present invention.

FIG. 3 illustrates a structure of a conductive particle based antenna according to an exemplary embodiment of the present invention. The particular structure of the conductive particle based antenna shown in FIG. 3 is merely an example used for explanation and is not intended to be limiting. The conductive particle based material used to fabricate the conductive particle based antenna of FIG. 3 is assumed to be formulated as a liquid, paint, gel, ink, or paste that dries or cures.

Referring to FIG. 3, the conductive particle based antenna includes a substrate 310, first coating 350, conductive particle based material coating 320, and a second coating 360. One or more of the substrate 310, the first coating 350, and the second coating 360 may be omitted. In addition, one or more additional coatings may be utilized.

The substrate 310 may be any surface of any object, regardless of what material(s) the object is constructed of. For example, the surface of a vehicle, the wall of a building, the casing of a wireless device, glass, a tree, cloth, a rock, a plastic sheet, etc., may be chosen as the substrate. When the substrate 310 is a conductive material, the substrate 310 may function as a ground plane.

The first coating 350 is applied on top of the substrate 310. The first coating 350 may be at least one of an insulative coating and a surface preparation coating. As an insulative coating, the first coating 350 may be a non-conductive or semi-conductive material. Examples of the insulative coating of the non-conductive or semi-conductive material include plastic tape, paper tape, paint, etc. As a surface preparation coating, the first coating 350 may be any material that allows for better adhesion of the conductive particle based material coating 320 to the substrate 310. The same coating may serve as both the insulative coating and a surface preparation coating. Alternatively, separate insulative and a surface preparation coatings may be utilized either together or individually. The first coating 350 may be formulated as a liquid, paint, gel, ink, or paste that dries or cures. In this case, the first coating 350 may be sprayed on, brushed on, rolled on, silk screened, ink jet printed, etc. The first coating 350 may be omitted.

The conductive particle based material coating 320 is applied on top of the first coating 350, if present. Otherwise, the conductive particle based material coating 320 is applied on top of the substrate 310. Alternatively, the conductive particle based material coating 320 may be an independent structure. The conductive particle based material coating may be formulated using any formulation of the conductive particle based material described herein. For example, the conductive particle based material coating 320 may be formulated as a liquid, paint, gel, ink, or paste that dries or cures. In this case, the non-conductive material may be sprayed on, brushed on, rolled on, silk screened, ink jet printed, etc.

The second coating 360, if utilized, is applied on top of the conductive particle based material coating 320. The second coating 360 may serve to protect and/or conceal the conductive particle based material coating 320. The second coating 360 may be any material or structure that protects and/or conceals the conductive particle based material coating 320. The same coating may serve as both the protective coating and the concealment coating. Alternatively, separate protective and concealment coatings may be utilized either together or individually. In one exemplary embodiment, the second coating 360 is formulated as a liquid, paint, gel, ink, or paste that dries or cures. In this case, the second coating 360 may be sprayed on, brushed on, rolled on, silk screened, ink jet printed, etc. The second coating 360 may be omitted.

Tests were conducted to compare the conductive particle based antenna to a conventional antenna. The conductive particle based antenna was formed using the conductive particle based material whereas the conventional copper antenna was formed using solid copper strips. Both the conductive particle based antenna and the conventional copper antenna were fabricated with the same shape (i.e., the shape shown in FIG. 2) of the same size so that the effect of the particular structure, if any, is equal to both antennas. A non-conductive plexiglass substrate was used to fix both antennas. The same transmit power and frequency were used for the test. The frequency selected was in the range of about 460 MHz. Testing equipment included a Yeasu FT 7900 Dual band FM transceiver, a Telewave Model 44 Wattmeter, and a FieldFox Model N9912A Portable Network Analyzer operated in SA mode used with a Yeasu Model Rubber Duck Antenna that was located 160 feet from the test antennas. The test data for the conventional copper antenna and the conductive particle based antenna are provided below in Table 1.

TABLE 1

| | Conventional Copper Antenna | Conductive Particle Based Antenna |
|---|---|---|
| Forward Power | 22 watts | 41 watts |
| Reverse Power | 12 watts | 1 watts |
| Relative Signal Strength | −35 decibels | −26 decibels |

As can be seen in Table 1, the conductive particle based antenna exhibits a significantly higher forward power (i.e., 41 watts) than the forward power of the conventional copper antenna (i.e., 22 watts). This can be explained by the conductive particle based antenna exhibiting a significantly lower reverse power (i.e., 1 watt) than the reverse power of the conventional copper antenna (i.e., 12 watts). Accordingly, the resulting relative signal strength of the conductive particle based antenna is higher (−26 decibels) than the resulting relative signal strength of the conventional copper antenna (−35 decibels).

As can be gleaned from the test, for a given antenna structure, the conductive particle based antenna is more efficient at emitting electromagnetic radiation into space than the conventional copper antenna. Therefore, the conductive particle based antenna has a higher effective gain than the conventional copper antenna. Also, since there is less reverse power, less of the electromagnetic radiation input to the conductive particle based antenna may be converted into heat. Thus, the antenna may operate at a lower temperature for a given input power and therefore may have a higher power rating.

The added gain by using the conductive particle based antenna is well suited to any application in which higher gain and/or lower transmit power for a given antenna structure is desired.

It has been observed that the transmission performance of the conductive particle based antenna varies depending on the type of amplifier used to drive the antenna. For example, the transmitter used in the Yeasu FT 7900 Dual band FM transceiver in the above test is a class C amplifier. When a linear class A amplifier is employed, the transmission performance of the conductive particle based antenna is reduced and approaches that of the conventional copper antenna. Thus, the performance of the conductive particle based antenna is greater when used with an amplifier that operates for less than the entire input cycle, such as the class C amplifier. While a class C amplifier is referred to herein for convenience in explanation, the use of any amplifier that operates for less than the entire input cycle is equally applicable.

Herein, power constrained devices typically employ a class C amplifier in order to take advantage of their efficiency so as to conserve power. Similarly, the use of the conductive particle based antenna in power constrained devices that employ a class C amplifier takes advantage of the efficiency of the conductive particle based antenna so as to further conserve power. The power conservation gained by the power constrained devices by using the conductive particle based antenna may allow for longer operational times and/or smaller power source (e.g., batteries) (and thereby smaller devices and/or a lower cost).

Conductive Particle Based Antenna Enhancer

In one exemplary embodiment, the conductive particle based material is employed to implement a conductive particle based antenna enhancer. When used as a conductive particle based antenna enhancer, the conductive particle based antenna enhancer is fabricated using the conductive particle based material. Here, the conductive particle based antenna enhancer is disposed in an adjacent offset relationship to a conventional antenna with a non-conductive or semi-conductive material disposed there between. Alternatively or additionally, an air gap between the conventional antenna and the conductive particle based antenna enhancer may be employed. Here, the conventional antenna is electrically coupled to at least one of a receiver, a transmitter, and a transceiver.

In this configuration, the conductive particle based antenna enhancer is at least one of capacitively and inductively coupled to the conventional antenna. Herein, the electromagnetic radiation that is capacitively and inductively coupled from the conventional antenna to the conductive particle based antenna enhancer is efficiently radiated into space by the conductive particle based antenna enhancer.

The conductive particle based antenna enhancer may be fabricated and positioned so as to be adjacent and offset from the conventional antenna. For example, the conductive particle based antenna enhancer may be added or built into a structure that places it in an adjacent and offset relationship to the conventional antenna.

For example, the structure may create an air gap between the conventional antenna and a surface onto which the conductive particle based material is applied. The structure may be constructed of a nonconductive material. Alternatively, the structure may be constructed of a conductive material and at least partially coated with a nonconductive material. If the structure is constructed of a conductive material, the conductive particle based material may be applied on top of the nonconductive material coating the structure. Herein, the conductive particle based material may be applied to a side of the structure closest to the conventional antenna or a side of the structure furthest from the conventional antenna. The conductive particle based material may be coated with a layer of the nonconductive material or another material. Examples of the structure include a housing of a device (e.g., a housing of a wireless device), an enclosure placed over the existing antenna, and a case placed over a housing of a device (e.g., a protective cover for a wireless device). The conductive particle based material is at least one of capacitively and inductively coupled to the conventional antenna and thereby increases the performance of the conventional antenna. Here, the thickness the nonconductive material and/or air gap directly affects the performance gain of the conductive particle based antenna enhancer and if the nonconductive thickness and/or air gap is too large, performance may decrease. The thickness of the air gap and/or nonconductive material is very small in relationship to the wavelength of the frequency the conventional antenna is designed for. In a specific example of the exemplary implementation described above, a conventional bumper case for an iPhone, which is manufactured by Apple, may have the conductive particle based material applied to a portion thereof that is adjacent to the antenna of the iPhone (the surface that is concealed when the iPhone is installed therein). Here, the conductive particle based material may have a layer of nonconductive material applied on top.

Another example of an implementation of a conductive particle based antenna enhancer is described below with reference to FIG. 4.

Figure 4:
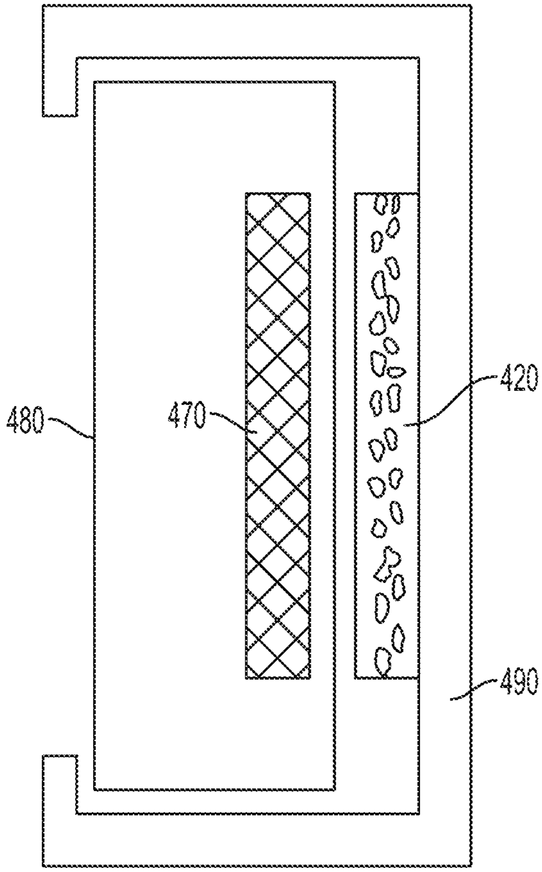
FIG. 4 illustrates an implementation of a conductive particle based antenna enhancer according to an exemplary embodiment of the present invention.

FIG. 4 illustrates an implementation of a conductive particle based antenna enhancer according to an exemplary embodiment of the present invention. The particular structure of the conductive particle based antenna shown in FIG. 4 is merely an example used for explanation and is not intended to be limiting. The conductive particle based material used to fabricate the conductive particle based antenna enhancer of FIG. 4 is assumed to be formulated as a liquid, paint, gel, ink, or paste that dries or cures.

Referring to FIG. 4, a wireless device 480 and a protective cover 490 are shown. The wireless device 480 includes an internal antenna 470. The protective cover 490 includes a conductive particle based antenna enhancer 420 that is disposed so as to be adjacent to the internal antenna 470 when the wireless device 480 is disposed in the protective cover 490.

While the conductive particle based antenna enhancer 420 is shown to correspond to the size of the internal antenna 470, the conductive particle based antenna enhancer 420 may be smaller or larger than the internal antenna 470. In addition, while the conductive particle based antenna enhancer 420 is shown as being disposed immediately adjacent to the internal antenna, the conductive particle based antenna enhancer 420 may be disposed at a different location on the protective cover 490.

While the conductive particle based antenna enhancer 420 is shown as being applied to an inner surface of the protective cover 490, the conductive particle based antenna enhancer 420 may be applied to an outer surface of, or may be disposed within, the protective cover 490. When the conductive particle based antenna enhancer 420 is disposed within the protective cover 490, the material used to construct the protective cover 490 may serve as the binder for the conductive particle based material. When, the conductive particle based antenna enhancer 420 is disposed at an inner or outer surface of the conductive particle based material, one or more of an insulative coating, a surface preparation coating, a protective coating, and a concealment coating may be used. In addition, the conductive particle based antenna enhancer 420 may be formed as an independent structure (with or without a substrate) that is fixed to the protective cover 490.

The conductive particle based antenna enhancer may be added to an existing conventional antenna or may be added at the time the conventional antenna is fabricated.

In one exemplary embodiment, the conductive particle based antenna enhancer is used to coat a conventional antenna that has been coated with a non-conductive material. The coating of the non-conductive material may be implemented as a liquid, paint, gel, ink, or paste that dries or cures. Herein, the non-conductive material may be sprayed on, brushed on, rolled on, silk screened, ink jet printed, etc. Alternatively, the coating of the non-conductive material may be a film or tape that is applied to the conventional antenna. Layers of other materials may be disposed between the conventional antenna and the non-conductive material and/or between the non-conductive material and the conductive particle based material. Here, depending on the configuration, the conductive particle based material may be coated with a layer of the nonconductive material and/or another material. Here, the thickness the non-conductive material may directly affect the performance gain of the conductive particle based material and if the thickness of the non-conductive material is too large, performance may decrease. The thickness of the non-conductive material is very small in relationship to the wavelength of the frequency the conventional antenna is designed for.

An example of a structure of a coated conductive particle based antenna enhancer is described below with reference to FIG. 5.

Figure 5:
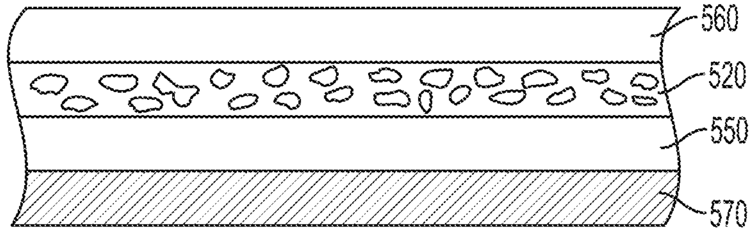
FIG. 5 illustrates a structure of a coated conductive particle based antenna enhancer according to an exemplary embodiment of the present invention.

FIG. 5 illustrates a structure of a coated conductive particle based antenna enhancer according to an exemplary embodiment of the present invention. The particular structure of the conductive particle based antenna shown in FIG. 5 is merely an example used for explanation and is not intended to be limiting. The conductive particle based material used to fabricate the conductive particle based antenna of FIG. 5 is assumed to be formulated as a liquid, paint, gel, ink, or paste that dries or cures.

Referring to FIG. 5, the coated conductive particle based antenna includes a conventional antenna 570, a first coating 550, a conductive particle based material coating 520, and a second coating 560. One or more of the first coating 550, and a second coating 560 may be omitted. In addition, one or more additional coatings may be utilized.

The conventional antenna 570 may be any surface of any conventional antenna, which in this example, is assumed to be constructed of a conductive material such as metal.

The first coating 550 is applied on top of the conventional antenna 570. The first coating 550 may be at least one of an insulative coating and a surface preparation coating. As an insulative coating, the first coating 550 may be a non-conductive or semi-conductive material. Examples of the insulative coating of the non-conductive or semi-conductive material include plastic tape, paper tape, paint, etc. As a surface preparation coating, the first coating 550 may be any material that allows for better adhesion of the conductive particle based material coating 520 to the conventional antenna 570. The same coating may serve as both the insulative coating and a surface preparation coating. Alternatively, separate insulative and a surface preparation coatings may be utilized either together or individually. The first coating 550 may be formulated as a liquid, paint, gel, ink, or paste that dries or cures. In this case, the first coating 550 may be sprayed on, brushed on, rolled on, silk screened, ink jet printed, etc. The first coating 550 may be omitted.

The conductive particle based material coating 520 is applied on top of the first coating 550, if present. Otherwise, the conductive particle based material coating 520 is applied on top of the conventional antenna 570. The conductive particle based material coating may be formulated using any formulation of the conductive particle based material described herein. For example, the conductive particle based material coating 520 may be formulated as a liquid, paint, gel, ink, or paste that dries or cures. In this case, the non-conductive material may be sprayed on, brushed on, rolled on, silk screened, ink jet printed, etc.

The second coating 560, if utilized, is applied on top of the conductive particle based material coating 520. The second coating 560 may serve to protect and/or conceal the conductive particle based material coating 520. The second coating 560 may be any material or structure that protects and/or conceals the conductive particle based material coating 520. The same coating may serve as both the protective coating and the concealment coating. Alternatively, separate protective and concealment coatings may be utilized either together or individually. In one exemplary embodiment, the second coating 560 is formulated as a liquid, paint, gel, ink, or paste that dries or cures. In this case, the second coating 560 may be sprayed on, brushed on, rolled on, silk screened, ink jet printed, etc. The second coating 560 may be omitted.

The conductive particle based antenna enhancer may be fabricated and positioned so as to be adjacent and offset from all or a portion of the conventional antenna. For example, the conductive particle based antenna enhancer may be fabricated and positioned so as to be adjacent to a portion of the conventional antenna corresponding to half or a quarter of the desired wavelength.

An example of an antenna partially coated with a conductive particle based antenna enhancer is described below with reference to FIG. 6.

Figure 6:
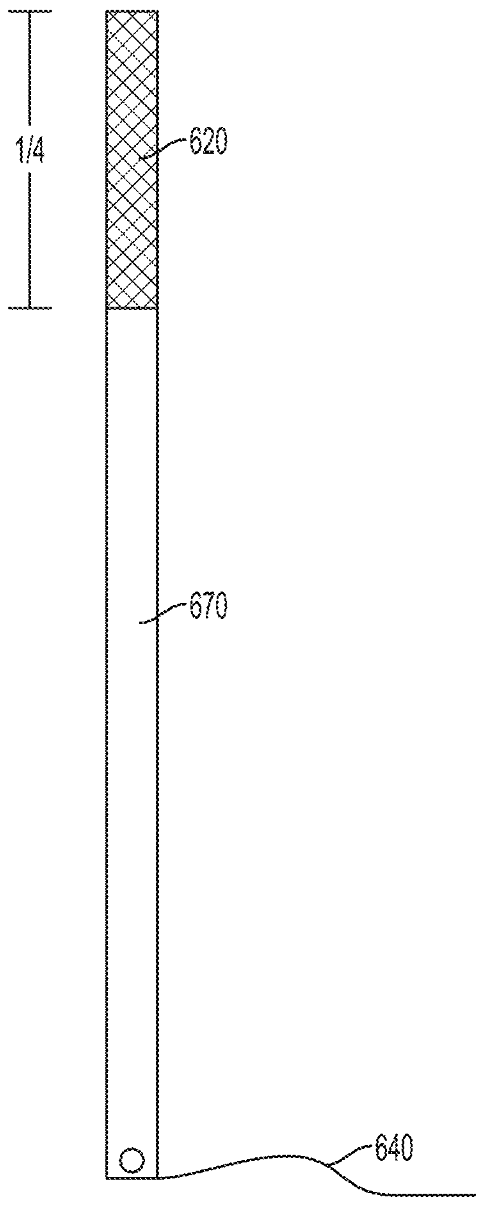
FIG. 6 illustrates an antenna partially coated with a conductive particle based antenna enhancer according to an exemplary embodiment of the present invention.

FIG. 6 illustrates an antenna partially coated with a conductive particle based antenna enhancer according to an exemplary embodiment of the present invention. The particular structure of the antenna partially coated with the conductive particle based antenna enhancer shown in FIG. 6 is merely an example used for explanation and is not intended to be limiting. The conductive particle based material used to fabricate the conductive particle based antenna of FIG. 6 is assumed to be formulated as a liquid, paint, gel, ink, or paste that dries or cures.

Referring to FIG. 6, an antenna 670 that is connected to a feed line 640 is shown. The antenna 670 is partially coated with a conductive particle based antenna enhancer 620. As can be seen, the conductive particle based antenna enhancer 620 coats about a quarter of the antenna 670.

Tests were conducted to compare a conventional copper antenna to the conventional copper antenna with the conductive particle based antenna enhancer. In particular, the same equipment and testing conditions as the test described above with respect to the conductive particle based antenna were performed. Here, insulative tape was applied to the entirety of the conventional copper antenna and the conductive particle based material was then applied onto the insulative tape.

The test data for the conventional copper antenna and the conventional copper antenna that has been enhanced with the conductive particle based antenna enhancer are provided below in Table 2.

TABLE 2

| | Conventional Copper Antenna | Conventional Copper Antenna with Conductive Particle Based Antenna Enhancer |
|---|---|---|
| Forward Power | 22 watts | 28 watts |
| Reverse Power | 12 watts | 10 watts |
| Relative Signal Strength | −35 decibels | −27 decibels |

As can be seen in Table 2, the conventional copper antenna with the conductive particle based antenna enhancer exhibits a significantly higher forward power (i.e., 28 watts) than the forward power of the conventional copper antenna alone (i.e., 22 watts). This can be explained by the conventional copper antenna with the conductive particle based antenna enhancer exhibiting a significantly lower reverse power (i.e., 10 watts) than the reverse power of the conventional copper antenna alone (i.e., 12 watts). Accordingly, the resulting relative signal strength of the conventional copper antenna with the conductive particle based antenna enhancer is higher (−27 decibels) than the resulting relative signal strength of the conventional copper antenna (−35 decibels).

As can be gleaned from the above identified test, the conventional copper antenna with the conductive particle based antenna enhancer is more efficient at emitting electromagnetic signals into space than the conventional copper antenna alone. Therefore, the conventional copper antenna with the conductive particle based antenna enhancer has a higher effective gain than the conventional copper antenna alone. Also, since there is less reverse power, less of the electromagnetic radiation input to the conventional copper antenna with the conductive particle based antenna enhancer will be converted into heat. Thus, the conventional copper antenna with the conductive particle based antenna enhancer may operate at a lower temperature for a given input power and therefore may have a higher power rating.

Accordingly, the conductive particle based material may be used to enhance a conventional antenna.

Conductive Particle Based Transmission Line

The conductive particle based material may be used to form a conductive particle based transmission line. To implement a conductive particle based transmission line, a transmission line is formed in any of the various ways described herein for forming an object using the conductive particle based material. Herein, at least some of the properties that enable the conductive particle based material to efficiently radiate electromagnetic radiation into space allow the conductive particle based material to efficiently radiate electromagnetic radiation down the transmission line formed using the conductive particle based material. The use of the conductive particle based material as a transmission line is beneficial due to its lower resistance and heat generation.

Conductive Particle Based Electromagnetic Radiation Harvester

The conductive particle based material may be used as an electromagnetic radiation harvester. The high efficiencies of the conductive particle based material in at least one of propagating and absorbing electromagnetic radiation make it ideally suited for use in collecting electromagnetic radiation. While such collected electromagnetic radiation may be electromagnetic radiation that was transmitted with the intention of being harvested by the electromagnetic radiation harvester, the collected electromagnetic radiation may be background electromagnetic radiation. Herein, the electromagnetic radiation harvester may be coupled to a receiver that collects the energy absorbed by the electromagnetic radiation harvester. The electromagnetic radiation harvester is formed in any of the various ways described herein for forming an object using the conductive particle based material.

Conductive Particle Based Conformable Antenna

The conductive particle based material may be used to construct a conductive particle based conformable antenna. The benefit of the conductive particle based conformable antenna may be easily appreciated when considered in the context of an exemplary use case, which is described below.

According to the exemplary use case, the conductive particle based conformable antenna may use used in a military setting. The Special Operations community has a major logistical and safety issue when it comes to communications in the theater. The US Department of Defense (DoD) has rapidly expanded its communications capabilities within the radio spectrum. In the past, two way radios in a variety of form factors where used for conventional Push-To-Talk (PTT) communications. The use of these systems has now evolved into a true “Digital Battlefield” consisting of a multitude of communications platforms. Vast arrays of data networks came into reality. The scope of radios used today varies widely from conventional voice to Satellite, mesh networks, to Unmanned Aerial Vehicles (UAVs) and unattended ground sensors.

The reason this wide variety of systems is mentioned is to give an understanding of why the conductive particle based conformable antenna may be beneficial to the mission of soldiers. Every RF device utilized by the military operates on a wide range of frequencies and a different type of transmission (Amplitude Modulation (AM), Frequency Modulation (FM), Satcom, Single Side band, etc.).

However, conventional antenna systems are designed and tuned for a limited range of frequencies and are generally designed to work with only one of the hundreds of types of radio devices on the market. The other major downsides to these conventional antenna systems are the logistics of getting them into battle. They are heavy, bulky, expensive, and difficult to transport. Accordingly, there is a need to address the shortcomings of the conventional antenna systems.

The conductive particle based conformable antenna addresses the shortcomings of the conventional antenna systems by being operable with any and all of the radios currently deployed and being developed. As opposed to being an antenna of fixed form, the conductive particle based conformable antenna may instead be constructed on an as needed basis.

For example, the conductive particle based conformable antenna may be constructed on site using the conductive particle based material. In this case, the conductive particle based material is a liquid, paint, gel, ink or paste that dries or cures. Herein, the conductive particle based conformable antenna may be applied to a substrate. In particular, the conductive particle based material may be sprayed on, brushed on, rolled on, silk screened, ink jet printed, etc.

The conductive particle based conformable antenna may be designed based on typical antenna design, theory, and formulas. The antenna design may be generated in advance or at the time the antenna is needed based on desired characteristics.

The conductive particle based material is applied to the substrate to form the conductive particle based conformable antenna based on the desired antenna design.

The substrate may be any surface of any material, such as acrylic, ABS, structural foams, solvent sensitive materials such as polycarbonate and polystyrene, and non-porous surfaces including primed wallboard, wood and clean metals, etc.

When the substrate is a conducting material, a non-conductive or semi-conductive coating may first be applied to the substrate. In this case, the conducting material may serve as a ground plane. When the substrate is a non-conducting material, a ground plane can be accomplished by using the earth's natural ground. Alternatively, the ground plane can be accomplished by fabricating an independent ground plane.

Once the antenna is fabricated, a feed line is coupled to the conductive particle based conformable antenna and an RF communications device. The conductive particle based conformable antenna is at least one of electrically, capacitively, and inductively coupled to a coupling point of the feed line. The conductive particle based conformable antenna may be coupled to the coupling point of the feed line at an end point of the conductive particle based conformable antenna. When capacitively or inductively coupled, the coupling may occur through a distance that includes an air gap or a substance, such as glass.

To fabricate the conductive particle based conformable antenna, a template of the desired antenna design may be used. The template may be a sheet formed of any rigid or semi-rigid material in which the desired design of the antenna is cut out.

An example of a template used to fabricate a conductive particle based conformable antenna is described below with reference to FIG. 7.

Figure 7:
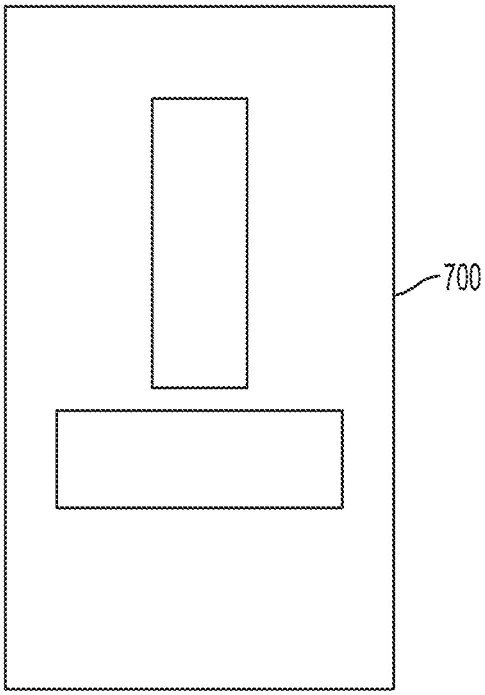
FIG. 7 illustrates a template used to fabricate a conductive particle based conformable antenna according to an exemplary embodiment of the present invention.

FIG. 7 illustrates a template used to fabricate a conductive particle based conformable antenna according to an exemplary embodiment of the present invention.

Referring to FIG. 7, a template 700 is shown. The template 700 may be any material that may be used to form a template or stencil. For example, the template 700 may be a sheet formed of a rigid or semi-rigid material. The cut out of the template 700 may be at least one of a positive and a negative of a desired design of an antenna. The template 700 may be an image displayed on a surface showing where conductive particle based material should or should not be applied. The template 700 may be an image displayed on a display or in a guide book that shows a desired design of an antenna. Herein, the template 700 shown in FIG. 7 corresponds to the antenna design shown in FIG. 2.

Examples of various cutout designs for the template 700 are found in U.S. Design patent application Ser. No. 29/390,425, filed on Apr. 25, 2011, and entitled “ANTENNA”; U.S. Design patent application Ser. No. 29/390,427, filed on Apr. 25, 2011, and entitled “ANTENNA”; U.S. Design patent application Ser. No. 29/390,432, filed on Apr. 25, 2011, and entitled “ANTENNA”; U.S. Design patent application Ser. No. 29/390,435, filed on Apr. 25, 2011, and entitled “ANTENNA”; U.S. Design patent application Ser. No. 29/390,436, filed on Apr. 25, 2011, and entitled “ANTENNA”; U.S. Design patent application Ser. No. 29/390,438, filed on Apr. 25, 2011, and entitled “ANTENNA”; and U.S. Design patent application Ser. No. 29/390,442, filed on Apr. 25, 2011, and entitled “ANTENNA”, the entire disclosure of each of which is hereby incorporated by reference.

An exemplary method for fabricating a conductive particle based conformable antenna using a template is described below with reference to FIG. 8.

Figure 8:
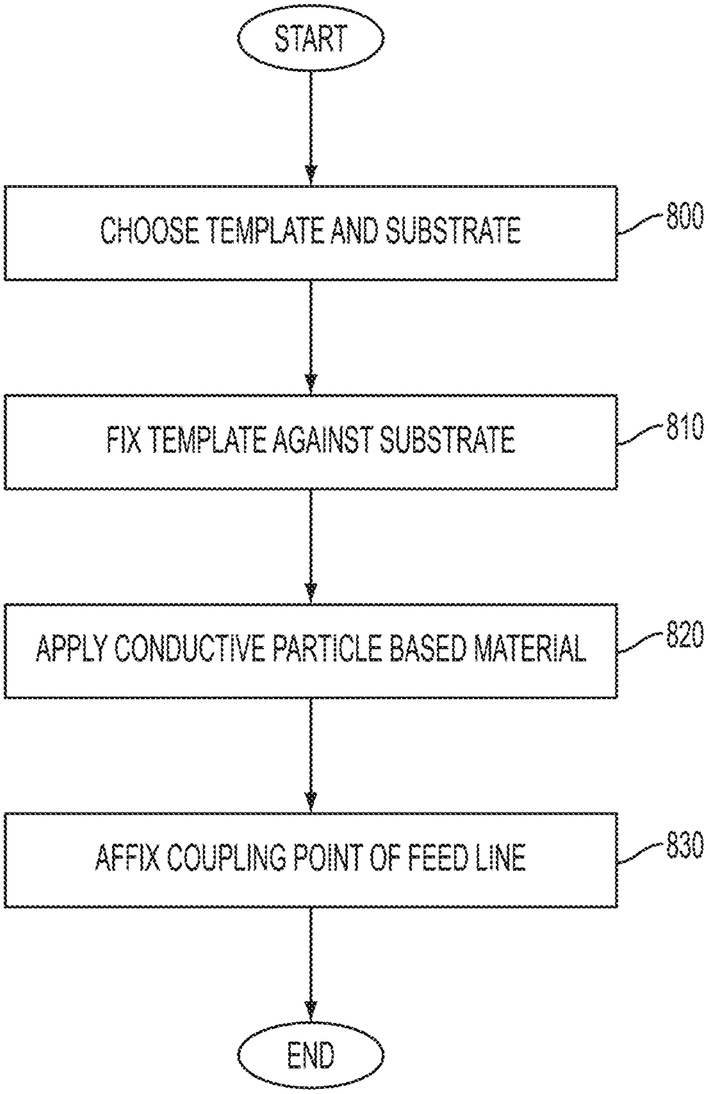
FIG. 8 illustrates a method for fabricating a conductive particle based conformable antenna using a template according to an exemplary embodiment of the present invention.

FIG. 8 illustrates a method for fabricating a conductive particle based conformable antenna using a template according to an exemplary embodiment of the present invention. Herein, the conductive particle based material used to fabricate the conductive particle based conformable antenna is assumed to be formulated as a liquid, paint, gel, ink, or paste that dries or cures.

Referring to FIG. 8, a template and substrate is chosen in step 800. In step 810, the chosen template may be fixed against the chosen substrate. In step 820, the conductive particle based material may then be applied on the template such that the conductive particle based material passes through at least one cut out portion of the template so as to be applied to the corresponding portion of the substrate. The conductive particle based material may be applied until its particle density reaches a certain threshold. This may be determined by measuring the resistance of the material across the length of the antenna (or antenna segment). Here, the threshold may correspond to a predefined resistance or range of resistances (e.g., 11-15 ohms).

The template may then be removed leaving the conductive particle based material to dry or cure on the chosen substrate according to the desired design. In step 830, one or more coupling points of a feed line may be affixed to the conductive particle based conformable antenna. Herein, step 830 may be omitted. In addition, additional steps may be included, such as applying at least one of an insulative coating, a surface preparation coating, a protective coating, and a concealment coating. Any or all of this fabrication technique may be automated, as will be described below.

While a conductive particle based conformable antenna is described herein, any disclosure related to a conductive particle based conformable antenna is equally applicable to a conductive particle based conformable antenna enhancer.

Fabrication Techniques for Conductive Particle Based Conformable Antenna

In one exemplary embodiment, techniques for constructing a conductive particle based conformable antenna are described. Herein, a computerized device is used to generate a template that is used to construct a conductive particle based conformable antenna.

The computerized device may be any of a desktop computer, a laptop computer, a netbook, a tablet computer, a Personal Data Assistant (PDA), a Smartphone, a portable media device, a specialized mobile device, etc. The computerized device may include one or more of a display, an input unit, a control unit, a printer, memory, a communications unit, and a projection unit.

The conductive particle based conformable antenna that is constructed using the template may be formed using the conductive particle based material that is sprayable, rollable or brushable. The conductive particle based material may be applied directly onto any substrate. The conductive particle based conformable antenna, once fabricated onto a surface, may be painted over with a paint in order to conceal the antenna, provide protection to the antenna, or provide the antenna with desired aesthetics.

According to an exemplary embodiment of the present invention, to create and install an antenna, the computerized device may be used to generate the template. The computerized device may include a graphical user interface that queries a user regarding certain characteristics/criteria or otherwise allows a user to enter certain characteristics/criteria. Based on the input characteristics/criteria, the computerized device generates the template. Herein, the user may input less than all of the characteristics/criteria. In this case, the characteristics/criteria not input by the user may be obtained via a formula, or a local or remote database. In addition, assumed values for the characteristics/criteria not input by the user may be used.

Examples of the characteristics/criteria include one or more of a substrate on which the antenna will be disposed, frequency of operation, aperture or antenna pattern, whether a space saving design is desired, velocity factor, resonant frequency, Q factor, impedance, gain, polarization, efficiency, bandwidth, heat characteristics, type of amplifier, environment, etc. Further, one or more of the characteristics/criteria may include a number of preset options for a given characteristic/criteria. For example, the options for the substrate on which the antenna will be disposed may include one or more of wood, metal, glass, plastic, etc. For another example, the options for the desired antenna pattern include one or more of an omni-directional antenna pattern, a directional antenna pattern, a circular antenna pattern, a phased array antenna pattern, etc.

The computerized device may guide a user in inputting at least one of the one or more the characteristics/criteria and may request additional information from the user.

Based on the input one or more characteristics/criteria, the computerized device determines an antenna pattern using a pattern determination algorithm. The antenna pattern may be a preset antenna pattern or an antenna pattern formed based on an algorithm and the input one or more characteristics/criteria. In addition, the computerized device may determine one or more of a scaling factor of the antenna pattern, dimensions of the antenna pattern or elements of the antenna pattern, grain direction, application notes, etc. Alternatively, or additionally, the characteristics/criteria may not be preset.

The computerized device may determine more than one antenna pattern and may allow a user to select a desired antenna pattern from among the determined more than one antenna pattern.

Once the antenna pattern is determined, as well as one or more of the scaling factor of the antenna pattern, dimensions of the antenna pattern or elements of the antenna pattern, grain direction, application notes, etc., a resulting template may be at least one of displayed on the display of the computerized device, projected onto a surface using the projection unit of the computerized device, and printed using one of an external and an integrated printed. When a projection unit is employed, the computerized device may further include a device that adjusts the scale of the projected template based on at least the distance between the projection unit and the surface on which the antenna is to be constructed. Further, when a projection unit is employed, the computerized device may further include a device that adjusts the location of the projected template so that the projected template remains on the same location of the surface regardless of the movement of the computerized device. The template may then be used to construct the antenna.

Also, the template may correspond to digital data that is stored in a storage device or communicated to another device that applies the antenna material based on the digital data.

In one exemplary embodiment, the computerized device communicates the input characteristics/criteria to a remote computerized device which determines one or more of the antenna pattern, the scaling factor of the antenna pattern, dimensions of the antenna pattern or elements of the antenna pattern, grain direction, application notes, etc., which is then communicated to the computerized device.

In one exemplary embodiment, the antenna patterns may be stored remotely from the computerized device and communicated to the computerized device before or after the antenna pattern is determined. The antenna patterns may be communicated to the computerized device in response to a request by the computerized device or another entity.

An exemplary method for fabricating a conductive particle based conformable antenna using a computerized device is described below with reference to FIG. 9.

Figure 9:
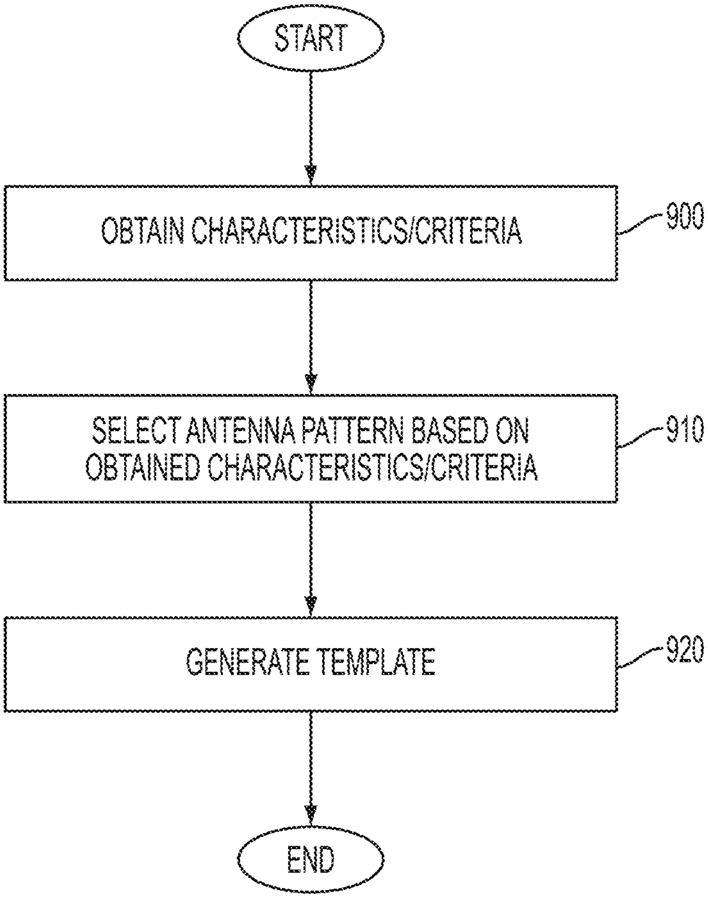
FIG. 9 illustrates a method for fabricating a conductive particle based conformable antenna using a computerized device according to an exemplary embodiment of the present invention.

FIG. 9 illustrates a method for fabricating a conductive particle based conformable antenna using a computerized device according to an exemplary embodiment of the present invention.

Referring to FIG. 9, in step 900, the characteristics/criteria are obtained by the computerized device as described above. In step 910, an antenna pattern is selected by the computerized device based on the obtained characteristics/criteria, as described above. In step 920, a template is generated as described above.

An example of the computerized device described above is described below with reference to FIG. 10.

Figure 10:
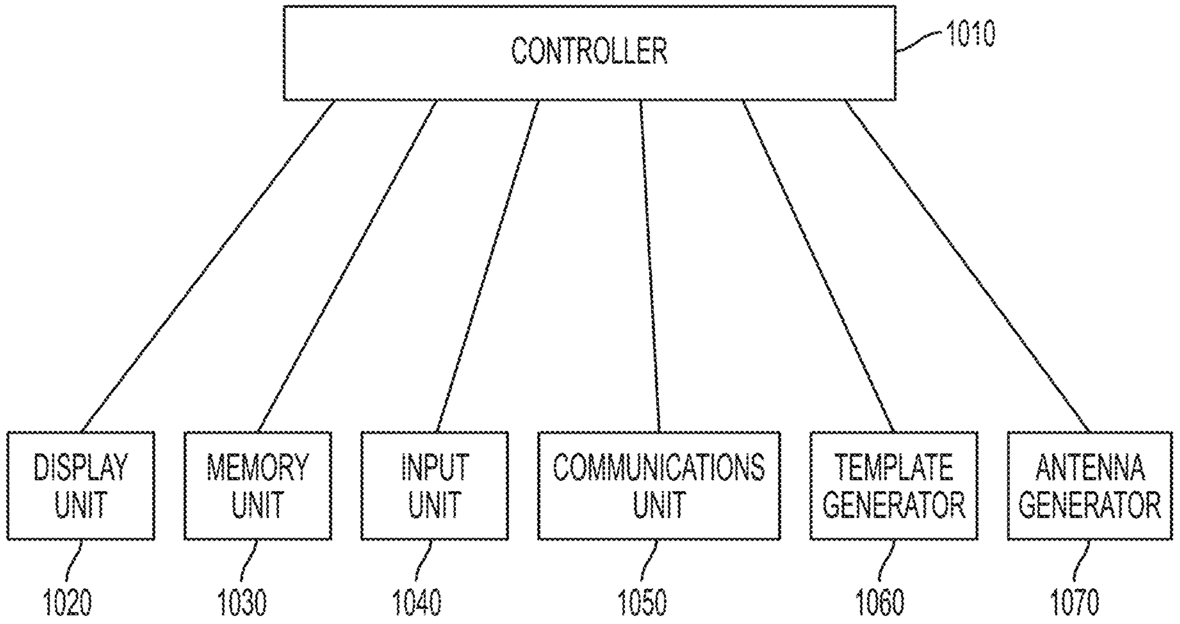
FIG. 10 illustrates a structure of computerized device used for fabricating a conductive particle based conformable antenna according to an exemplary embodiment of the present invention.

FIG. 10 illustrates a structure of computerized device used for fabricating a conductive particle based conformable antenna according to an exemplary embodiment of the present invention.

Referring to FIG. 10, the computerized device includes a controller 1010, a display unit 1020, a memory unit 1030, an input unit 1040, a communications unit 1050, a template generator 1060, and an antenna generator 1070. One or more of the components of the computerized device shown in FIG. 10 may be omitted. Also, the functions of one or more of the components of the computerized device shown in FIG. 10 may be performed by a combined component. In addition, additional components may be included with the computerized device.

The controller 1010 controls the overall operations of the computerized device. More specifically, the controller 1010 controls and/or communicates with the display unit 1020, the memory unit 1030, the input unit 1040, the communications unit 1050, the template generator 1060, and the antenna generator 1070. The controller 1010 executes code to have performed or perform any of the functions/operations/algorithms/roles explicitly or implicitly described herein as being performed by a computerized device. The term "code" may be used herein to represent one or more of executable instructions, operand data, configuration parameters, and other information stored in the memory unit 1030.

The display unit 1020 is used to display information to a user. The display unit 1020 may be any type of display unit. The display unit 1020 may be integrated with or separate from the computerized device. The display unit 1020 may be integrated with the input unit 1040 to form a touch screen display. The display unit 1020 performs any of the functions/operations/roles explicitly or implicitly described herein as being performed by a display.

The memory unit 1030 may store code that is processed by the controller 1010 to execute any of the functions/operations/algorithms/roles explicitly or implicitly described herein as being performed by a computerized device. In addition, one or more of other executable instructions, operand data, configuration parameters, and other information may be stored in the memory unit 1030. Depending on the exact configuration of the computerized device, the memory unit 1030 may be volatile memory (such as Random Access Memory (RAM)), non-volatile memory (e.g., Read Only Memory (ROM), flash memory, etc.) or some combination thereof.

The input unit 1020 is used to enable a user to input information. The input unit 1020 may be any type or combination of input unit, such as a touch screen, keypad, mouse, voice recognition, etc.

The communications unit 1050 transmits and receives data between one or more entities. The communications unit 1050 may include any number of transceivers, receivers, and transmitters of any number of types, such as wired, wireless, etc.

The template generator 1060 may perform any of the functions/operations/algorithms/roles explicitly or implicitly described herein as being performed when generating a template. For example, the template generator 1060 may be a printer, a cutter, a projector, a display, etc.

The antenna generator 1070 may perform any of the functions/operations/algorithms/roles explicitly or implicitly described herein as being performed when generating an antenna. For example, the antenna generator 1070 may be a sprayer that sprays the conductive particle based material onto a substrate.

Herein, the functionality described above of the computerized device may result from an application installed on and being executed by the computerized device.

At this point it should be noted that the present exemplary embodiment as described above typically involve the processing of input data and the generation of output data to some extent. This input data processing and output data generation may be implemented in hardware, or software in combination with hardware. For example, specific electronic components may be employed in a mobile device or similar or related circuitry for implementing the functions associated with the exemplary embodiments of the present invention as described above. Alternatively, one or more processors operating in accordance with stored instructions (i.e., code) may implement the functions associated with the exemplary embodiments of the present invention as described above. If such is the case, it is within the scope of the present disclosure that such instructions may be stored on one or more non-transitory processor readable mediums. Examples of the non-transitory processor readable mediums include ROM, RAM, Compact Disc (CD)-ROMs, magnetic tapes, floppy disks, and optical data storage devices. The non-transitory processor readable mediums can also be distributed over network coupled computer systems so that the instructions are stored and executed in a distributed fashion. Also, functional computer programs, instructions, and instruction segments for accomplishing the present invention can be easily construed by programmers skilled in the art to which the present invention pertains.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. An electronic device comprising:
at least one of a receiver or a transmitter; and
an antenna,
wherein the antenna comprises:
a first element formed of a conductive material, the first element being electrically coupled to the at least one of the receiver or the transmitter, and
a second element formed of a conductive particle based material, the second element being disposed separately from the first element,
wherein the second element enhances at least one of reception or transmission performance of the first element,
wherein the conductive particle based material comprises conductive particles dispersed in a binder so that at least a majority of the conductive particles are adjacent to, but do not touch, one another,
wherein the binder is disposed between at least a part of the conductive particles that are adjacent to, but do not touch, one another,
wherein at least some of the conductive particles of the conductive particle based material that are adjacent to one another are at least one of capacitively or inductively coupled to one another, and
wherein at least a portion of the conductive particles of the conductive particle based material forming the second element are at least one of capacitively or inductively coupled to first element.

2. The electronic device of claim 1, wherein the conductive particles comprise at least one of conductive particles of different non-uniform shapes, conductive particles of various sizes, or conductive particles smaller than 30 micrometers.

3. The electronic device of claim 1, wherein a non-conductive material is disposed adjacent to at least a part of one side of the second element.

4. The electronic device of claim 1, wherein the second element is at least one of flexible or semi-flexible.

5. The electronic device of claim 1, wherein the second element is coupled to a reference ground.

6. The electronic device of claim 1, wherein the second element is a transmission line.

7. The electronic device of claim 1, wherein the second element is an antenna enhancing element.

8. The electronic device of claim 1, wherein the second element is one of a receiving or radiating antenna element.

9. The electronic device of claim 1, wherein a radio frequency signal passes between the first element and the second element.

10. The electronic device of claim 1, wherein the second element is applied directly onto at least a portion of the first element.

11. The electronic device of claim 1, wherein the second element is spaced apart from the first element.

12. The electronic device of claim 1,
wherein at least a portion of the first element is formed in a first plane and at least a portion of the second element is formed in a second plane,
wherein the first plane is parallel to the second plane, and
wherein the at least the portion of the first element in the first plane and the at least the portion of the second element in the second plane at least partially overlap when viewed perpendicular to the first and second planes.

13. The electronic device of claim 12, wherein a cross sectional area of the at least the portion of the second element in the second plane is a same as, or less than, a cross sectional area of the at least the portion of the first element in the first plane.

14. The electronic device of claim 1, wherein the conductive particle based material has non-ohmic conduction with direct current (DC).

15. An antenna subassembly comprising:
a first element formed of a conductive material, the first element being electrically coupled to the at least one of a receiver or a transmitter, and
a second element formed of a conductive particle based material, the second element being disposed separately from the first element,
wherein the second element enhances at least one of reception or transmission performance of the first element,
wherein the conductive particle based material comprises conductive particles dispersed in a binder so that at least a majority of the conductive particles are adjacent to, but do not touch, one another,
wherein the binder is disposed between at least a part of the conductive particles that are adjacent to, but do not touch, one another,
wherein at least some of the conductive particles of the conductive particle based material that are adjacent to one another are at least one of capacitively or inductively coupled to one another, and wherein at least a portion of the conductive particles of the conductive particle based material forming the second element are at least one of capacitively or inductively coupled to first element.

16. The antenna subassembly of claim 15, wherein the conductive particles comprise at least one of conductive particles of different non-uniform shapes, conductive particles of various sizes, or conductive particles smaller than 30 micrometers.

17. The antenna subassembly of claim 15, wherein the conductive particle based material has non-ohmic conduction with direct current (DC).

18. The antenna subassembly of claim 15, wherein a non-conductive material is disposed adjacent to at least a part of one side of the second element.

19. The antenna subassembly of claim 15, wherein the second element is at least one of flexible or semi-flexible.

20. The antenna subassembly of claim 15, wherein the second element is coupled to a reference ground.

21. The antenna subassembly of claim 15, wherein the second element is a transmission line.

22. The antenna subassembly of claim 15, wherein the second element is an antenna enhancing element.

23. The antenna subassembly of claim 15, wherein the second element is one of a receiving or radiating antenna element.

24. The antenna subassembly of claim 15, wherein a radio frequency signal passes between the first element and the second element.

25. The antenna subassembly of claim 15, wherein the second element is applied directly onto at least a portion of the first element.

26. The antenna subassembly of claim 15, wherein the second element is spaced apart from the first element.

27. The antenna subassembly of claim 15, wherein at least a portion of the first element is formed in a first plane and at least a portion of the second element is formed in a second plane, wherein the first plane is parallel to the second plane, and wherein the at least the portion of the first element in the first plane and the at least the portion of the second element in the second plane at least partially overlap when viewed perpendicular to the first and second planes.

28. The antenna subassembly of claim 27, wherein a cross sectional area of the at least the portion of the second element in the second plane is a same as, or less than, a cross sectional area of the at least the portion of the first element in the first plane.

* * * * *